UNITED STATES PATENT OFFICE.

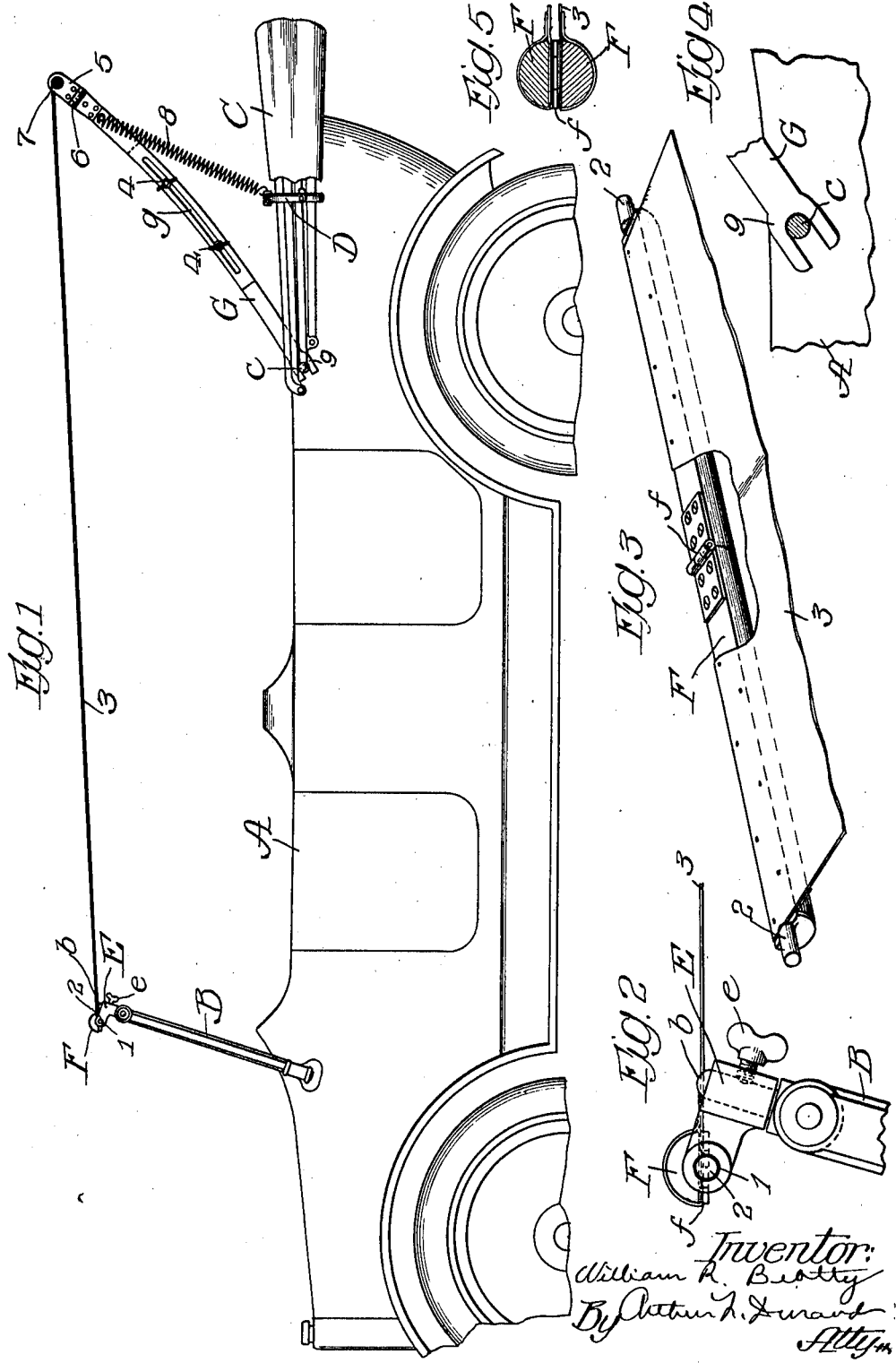

WILLIAM R. BEATTY, OF CHICAGO, ILLINOIS.

AUTOMOBILE-SUNSHADE.

1,311,870.  Specification of Letters Patent.  Patented Aug. 5, 1919.

Application filed July 23, 1917. Serial No. 182,114.

*To all whom it may concern:*

Be it known that I, WILLIAM R. BEATTY, a citizen of the United States of America, and resident of Chicago, Cook County, Illinois, have invented a certain new and useful Improvement in Automobile-Sunshades, of which the following is a specification.

This invention relates to autombile tops in general, but more particularly to those for use in pleasant weather, merely as a sun-shade, and more especially to those which are readily attachable and detachable, so that the entire device may be taken off and folded and conveniently stored away when not in use.

Generally stated, the object of this invention is to provide a novel and improved sun-shade of the foregoing general character.

A special object is to provide a sun-shade that can be used on automobiles which are equipped with folding tops for use in stormy weather, whereby the sun-shade can be used in pleasant weather as a substitute for the folding top, but can be quickly removed to permit unfolding of the regular or usual top, so that either one can be substituted for the other without inconvenience.

It is also an object to provide certain details and features of construction and combinations tending to increase the general efficiency and desirability of a sun-shade of this particular character.

To the foregoing and other useful ends, this invention consists in matters hereinafter set forth and claimed.

In the accompanying drawings:—

Figure 1 is a side elevation of an automobile equipped with a sun-shade embodying the principles of this invention, the lower portions of the automobile wheels being broken away for convenience of illustration.

Fig. 2 is a side elevation, on a larger scale, of the upper end-portion of the wind-shield, illustrating the method of attaching the sun-shade thereto.

Fig. 3 is a perspective of the forward portion of the sun-shade, showing the same upside down, and with a portion of the covering broken away to bring into view the hinge by which the two sections of the transverse support of the sun-shade are foldably connected together.

Fig. 4 is an enlarged detail view illustrating the method of mounting the rear supports of the sun-shade on the pivots which are ordinarily provided for the folding or carriage top of an automobile.

Fig. 5 is a cross-section of the structure shown in Fig. 3, showing the same in folded condition.

As thus illustrated, the invention comprises an automobile body A of any suitable form or construction. The wind-shield B may also be of the usual or any suitable form, but is preferably of the kind in which the top of the wind-shield is provided at each side thereof with an upstanding portion $b$, or with some equivalent means. The folding or carriage top C can be of any suitable character, but is preferably pivoted at $c$ upon the opposite sides of the body of the automobile, so that it can be raised and unfolded and brought forward in the usual and well-known manner. Also, as is usual with folding automobile tops of this kind, the sides of the body are provided with supporting or retaining devices D for receiving the frame of the folding top when the latter is in folded condition.

The sun-shade comprises a pair of metal brackets or fittings E, one for each side of the wind-shield, mounted on the upstanding portions $b$ and detachably secured thereto by set-screws $e$, or by any suitable means. These fittings E have sockets 1 to receive the reduced end-portions 2 of the transverse support F, which latter is preferably jointed in the middle and provided with a hinge $f$ so that it can be folded into substantially half the length thereof. The covering 3 may be of any suitable material, such as canvas or silk, or it may be of waterproof material if such is desired; but as the general intent and purpose of the device is merely that of a sun-shade, this covering is preferably of light material which can be tightly rolled up or folded when the sun-shade is removed from the automobile. The covering 3 is attached to the support F in any suitable manner, as by securing it to the flat under side of said support, and as the hinge F is on the under side of the support, so that the adjacent ends of the two sections are tight together, it follows that the support will remain horizontal when in use. The reduced end-portions 2 preferably tightly fit the sockets 1, and, if necessary or desirable, any suitable means can be employed for detachably retaining the portions 2 in the sockets 1, thereby to further insure against displacement of the support F while the automobile is in motion. The means for supporting the rear end of the covering 3 preferably comprises a pair of upright supports G, one for each side of the automobile. Each support G can be made in any suitable manner, but preferably comprises two sections which are connected together by the slot g in one section and the screws and thumb-nuts 4 on the other section, so that the entire support can be adjusted to change its length, in a manner that will be readily understood. Each support G is provided at its upper end with a bracket or fitting 5, which is mounted on a hinge 6, whereby each support cannot only be shortened, in the manner stated, but can also be folded near its upper end, whereby each support is materially shortened when the entire sun-shade is taken off and folded for storage. Each fitting or bracket 5 is provided with a socket 7, and the rear end of the covering 3 is secured to a transverse support which is similar to the support F, and which has the end-portions thereof mounted in the sockets 7, whereby the two transverse end supports of the covering 3 can be removed and folded, so that the top when rolled up upon either of the transverse supports is only substantially half as wide as when in use. Coil springs 8 connect the upper end-portions of the supports G with the tops of the supports or retaining devices D, in any suitable manner, so that these supports G have a constant tendency to tilt downward at their upper ends, thereby keeping the covering 3 stretched tightly between the two transverse end supports thereof. It will also be seen that the lower end of each support G is provided with a fork 9 to engage one of the pivots c, so that the supports G may tilt up and down under the yielding tension of the springs 8, and whereby these supports may be readily disengaged from the pivots c when it is desired to remove the sun-shade and fold and roll up the different portions thereof for storage.

With the foregoing construction, it will be seen that the regular folding top C, which will be used in stormy weather, can be folded up to make way for the sun-shade, and that the latter affords a full view in all directions, and good circulation of the air, but at the same time affords relief from the sun. On the other hand, the sun-shade can be removed very quickly, thereby to permit the folding top C to be raised in stormy weather, and in this way the two tops can be used interchangeably and practically without any extra trouble or inconvenience. The sun-shade comprises only the top covering 3, it will be seen, so far as the sheet material is concerned, so that the space is open at the rear of the automobile, whereby the sun-shade does not catch or hold any air and constitutes practically no air resistance to the motion of the car. When it is desired to remove the sun-shade, the fittings E are removed, and the supports G are disengaged from the pivots c, and the entire sun-shade, after folding the transverse supports, is then rolled up and reduced to a very small bundle which can be stored away under one of the seats of the automobile.

The upstanding portions b, it will be understood, are those which are ordinarily employed for holding the front end of the folding carriage top C, the latter being provided with socket-pieces (similar to the socket-pieces E), so that the front end of the top can be raised and brought forward, and can be secured in place by slipping these socket-pieces over the portions b and by detachably securing them thereto by setscrews or any other suitable means. Thus, the means ordinarily employed for supporting the front end of the carriage top are also employed for supporting the front end of the sun-shade, and the pivots c, as previously explained, not only support the carriage top C for pivotal movement in the raising and lowering thereof, but also support the devices by which the rear end of the sun-shade is held in position. In this way the transverse member F, and also the similar one at the rear end of the covering 3, are supported in position to keep the covering stretched tightly between the front and rear ends thereof, with the front end preferably a little lower than the rear end, so that the air pressure will be downward instead of upward. The springs 8 hold the sun-shade in place and are a part of the devices by which allowance is made for variations in the length of the covering because of stretching and shrinkage, but any suitable means can be employed at the rear of the automobile for doing this. Of course, the supports G can be each formed in one piece, so that they will not be extensible or foldable, if such is desired. However, the hinges 6 permit these supports to be folded toward each other, upon the under side of the transverse member which is supported in the socket 7, or they can be folded outward, depending upon which is most convenient when the sun-shade is removed and rolled into a bundle.

In the construction shown and described it will be seen that the folding top C and the sun-shade cover 3 are adapted to be interchangeably connected with the top of the windshield B so that the latter serves for both purposes. In other words, this windshield serves to support the front end of either the sun-shade or the folding top, in the manner explained.

With the specific construction shown and described, it will be seen that the sun-shade is only applicable to automobiles having folding tops, inasmuch as the folding top mechanism provides the pivots c for the lower ends of the supports G and also provides the portions D by which to engage the lower ends of the springs 8, but it will be understood, of course, that certain features of the invention can be used in any suitable or desired manner on automobiles that do not have folding tops, if such is desirable or necessary. With a construction involving a folding top, such, for example, as that shown and described, means are provided to receive the instrumentalities which support and hold in position the rear end of the sun-shade, but any suitable or desired means can be employed for this purpose. The springs 8, or any connections employed for this purpose, tend to pull the supports G backward, and maintain them in a rearwardly inclined position, so that the sun-shade is not only stretched taut and held against sagging between its front and rear ends, but is also extended at its rear end over the rear portion of the automobile body, so that the sun-shade will extend over the occupants in the rear seat as well as those in the front seat.

It is an important consideration, it will be seen, that the supporting devices G, which are preferably in the form of oppositely arranged uprights, are movably connected together at their upper ends, so that the rear transverse member can be disconnected therefrom to facilitate the rolling up of the covering. Of course, the sun-shade thus provided can be rolled into one bundle by wrapping the covering around the front member F and the similar rear member, and around the supports G, or the latter can be detached and packed away separately in the automobile. In any event, the covering can be rolled up on either the front member or the rear member, and the two members are foldable to reduce the length of the bundle or roll thus formed. Also, with this construction, the supports G are each capable of self-adjustment independently of each other to stretch the covering straight at each longitudinal edge thereof.

What I claim as my invention is:—

1. The combination of an automobile body, a windshield therefor, a folding top at the rear of the body, pivotal portions for supporting said folding top, a sun-shade covering stretched rearward from the top of the wind-shield, oppositely arranged and upwardly extending devices movably connected together at their upper ends and forming a support for holding the rear end of said covering a distance above the folded top, so that the space below said covering is open at both sides and at the rear thereof, said devices having provisions to permit adjustment of said support bodily, whereby allowance is made for variations in the length of the covering because of stretching or shrinkage, and means to support the front end of said covering on the wind-shield, so that said sun-shade and said folding top can be interchangeably connected to said wind-shield, the overhead sun-shade thus provided being removable in its entirety to permit unfolding of said folding top, and said pivotal portions forming means to detachably support said devices.

2. The structure of claim 1, as stated, said devices comprising a transverse member to which the covering is secured, rearwardly inclined supports for the ends of the transverse member, and springs for yieldingly holding said inclined supports in position, so that said covering will be stretched tightly between the front and rear ends thereof.

3. The structure of claim 1, as stated, and instrumentalities including spring means to tilt said devices backward to keep said covering stretched tightly between the front and rear ends thereof.

4. The structure of claim 1, as stated, said means comprising a transverse member to which the covering is secured, the ends of said member being detachably mounted on the wind-shield, and said devices having a transverse member to which the covering is secured and elements provided on said devices to movably support the opposite ends of said last mentioned transverse member, so that the rear member may be moved bodily to stretch the covering, and whereby the covering may be rolled up on either member.

5. An automobile sun-shade comprising a covering, means to detachably connect the front end of said covering to the top of a wind-shield, and removable devices comprising two uprights and a horizontal cross member which are movably connected and which form a support for the rear end of said covering, having provisions to permit adjustment of said support bodily, so that allowance is made for variations in the length of the covering because of stretching or shrinkage, and whereby the entire overhead sun-shade thus provided can be removed with its said supporting means and devices and entirely detached and folded and rolled into a single compact bundle for storage within or upon the automobile.

6. The structure of claim 5, as stated, said devices including a transverse member to which the covering is attached, inclined supports for the ends of said transverse member, and springs to yieldingly maintain said inclined supports in position, so that said covering will be stretched tightly between the front and rear ends thereof.

7. The structure of claim 5, as stated, said devices including side supports which are each adjustable lengthwise thereof to vary the height of said covering.

8. The structure of claim 5, as stated, said devices comprising a transverse member to which the covering is attached, said support being hinged to fold at the middle thereof, and said means comprising a transverse member to which the front end of the covering is secured and which is also hinged to fold at the middle thereof, so that the covering can be folded longitudinally and about midway between its side edges and then rolled up upon one of the folded supports.

9. The structure of claim 5, as stated, said devices comprising a pair of detachable side supports connected by a transverse member to which the covering is attached, said side supports being hinged to fold upon the transverse member.

10. The structure of claim 5, as stated, said devices including spring means to keep the covering stretched tightly between the front and rear ends thereof.

11. The structure of claim 1, as stated, said devices consisting of removable supports having their lower ends notched to detachably engage said pivotal portions of said folding top.

12. The structure of claim 1, as stated, said body having elements at opposite sides thereof to support said top in folded position, and said devices having springs connected to said elements to keep the covering stretched tightly between the front and rear ends thereof.

13. The combination of a wind-shield, an overhead covering to form a sun-shade, means to detachably connect the front end of said covering to the top of the wind-shield, a pair of members extending upwardly and rearwardly, means to detachably support the lower ends of said members, means to connect the rear end of said covering to the upper ends of said members, and spring means to tilt said members backward and thereby hold said covering in stretched condition.

14. An automobile sun-shade comprising a covering, means to detachably connect the front end of said covering to the top of a wind-shield, and devices to removably support the rear end of said covering, so that the entire over-head sun-shade thus provided can be removed with its said supporting means and devices and entirely detached and folded and rolled into a single bundle for storage, said devices including a transverse member to which the covering is attached, inclined supports for the ends of said transverse member, and springs to yieldingly maintain said inclined supports in position, so that said covering will be stretched tightly between the front and rear ends thereof.

15. An automobile sun-shade comprising a covering, means to detachably connect the front end of said covering to the top of a wind-shield, and devices to removably support the rear end of said covering, so that the entire over-head sun-shade thus provided can be removed with its said supporting means and devices and entirely detached and folded and rolled into a single bundle for storage, said devices comprising a transverse member to which the covering is attached, said support being hinged to fold at the middle thereof, and said means comprising a transverse member to which the front end of the covering is secured and which is also hinged to fold at the middle thereof, so that the covering can be folded longitudinally and about midway between its side edges and then rolled up upon one of the folded supports.

16. The combination of an automobile body, a wind-shield therefor, a sun-shade to extend over the occupants of the automobile, means to detachably connect the front end of said sun-shade to said wind-shield, supports extending upward from the opposite sides of the rear portion of said automobile body, means to detachably engage the lower ends of said supports, and whereby each support is pivoted at its lower end, means to connect the upper ends of said supports with the rear end of said sun-shade, and connections extending downward from the upper portion of each support to pull said supports backward to keep the sun-shade stretched taut between the front and rear ends thereof.

17. A structure as specified in claim 16, said connections extending downward from the upper portions of said supports, said automobile body having means to engage the lower ends of said connections, and said means for engaging the lower ends of said supports consisting of pivots on said body, said supports being inclined rearwardly to extend the sun-shade over the rear portion of said body.

18. A structure as specified in claim 16, said supports being hinged to fold toward each other when removed from the automobile.

19. A structure as specified in claim 16, said supports being each composed of two sections which are adjustably connected together to raise and lower the rear end of said sun-shade.

20. A structure as specified in claim 16, said sun-shade having hinges at opposite ends thereof to permit longitudinal folding of the sun-shade when removed from the automobile.

Signed by me at Chicago, Illinois, this 20th day of July, 1917.

WILLIAM R. BEATTY.

Copies of this patent may be obtained for five cents each, by addressing the "Commissioner of Patents, Washington, D. C."